United States Patent
Noro et al.

(10) Patent No.: US 7,594,853 B2
(45) Date of Patent: Sep. 29, 2009

(54) CONTROL APPARATUS AND METHOD FOR GAMES AND OTHERS

(75) Inventors: Hideo Noro, Tokyo (JP); Yasuhiro Okuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 11/451,280

(22) Filed: Jun. 12, 2006

(65) Prior Publication Data
US 2006/0247049 A1    Nov. 2, 2006

Related U.S. Application Data

(62) Division of application No. 10/000,673, filed on Nov. 15, 2001, now abandoned.

(30) Foreign Application Priority Data

Nov. 17, 2000  (JP) .............................. 2000-351996
Nov. 1, 2001   (JP) .............................. 2001-336512

(51) Int. Cl.
    *A63F 13/00*    (2006.01)

(52) U.S. Cl. .................. 463/34; 463/30; 463/31; 463/36; 463/37; 273/148 B; 273/317.1; 345/3.4

(58) Field of Classification Search ................. 463/1–2, 463/4–5, 7–8, 30–34, 36–39, 49–57; 273/148 R, 273/148 B, 309, 317.1, 340, 348, 361–367; 348/115, 117, 211.14; 717/168–178; 345/1.1–3.4; 434/37, 240
See application file for complete search history.

(56) References Cited

U.S. PATENT DOCUMENTS

| | | | | |
|---|---|---|---|---|
| 4,209,255 A * | 6/1980 | Heynau et al. | ............ | 356/141.3 |
| 4,613,139 A * | 9/1986 | Robinson, II | ................. | 463/37 |
| 4,924,216 A * | 5/1990 | Leung | ........................... | 463/38 |
| 4,988,111 A * | 1/1991 | Gerlizt et al. | .................. | 463/5 |
| 5,288,078 A * | 2/1994 | Capper et al. | ................. | 463/39 |
| 5,319,387 A * | 6/1994 | Yoshikawa | .................. | 345/179 |
| 5,320,538 A * | 6/1994 | Baum | ..................... | 434/307 R |
| 5,329,276 A * | 7/1994 | Hirabayashi | ........... | 340/870.31 |
| 5,349,379 A * | 9/1994 | Eichenlaub | .................. | 348/59 |
| 5,368,309 A * | 11/1994 | Monroe et al. | ................ | 463/34 |
| 5,388,990 A * | 2/1995 | Beckman | ..................... | 434/38 |
| 5,394,517 A * | 2/1995 | Kalawsky | ................... | 345/632 |
| 5,421,589 A * | 6/1995 | Monroe | ......................... | 345/9 |
| 5,491,510 A * | 2/1996 | Gove | ........................... | 348/77 |
| 5,521,616 A * | 5/1996 | Capper et al. | .............. | 345/156 |
| 5,592,401 A * | 1/1997 | Kramer | ...................... | 702/153 |
| 5,641,288 A * | 6/1997 | Zaenglein, Jr. | .............. | 434/21 |
| 5,683,297 A * | 11/1997 | Raviv et al. | ................... | 463/34 |
| 5,684,943 A * | 11/1997 | Abraham et al. | ........... | 345/473 |

(Continued)

*Primary Examiner*—Peter DungBa Vo
*Assistant Examiner*—Arthur O. Hall
(74) *Attorney, Agent, or Firm*—Cowan, Liebowitz & Latman, P.C.

(57) ABSTRACT

There is provided a control apparatus for a game or the like, that is capable of automatically carrying out a game or simulation starting/terminating process according to operations performed necessarily in executing the game or simulation. Controllers are mounted on or gripped by a player for operation. Position sensors detect the positional relationship of the controllers with respect to a space for executing the game. A control circuit controls the start/termination of the game, and the, turning-on/off of power sources of the controllers, according to the results of the detection by the position sensors.

4 Claims, 9 Drawing Sheets

U.S. PATENT DOCUMENTS

| | | | |
|---|---|---|---|
| 5,742,263 A * | 4/1998 | Wang et al. | 345/8 |
| 5,795,227 A * | 8/1998 | Raviv et al. | 463/34 |
| 5,812,257 A * | 9/1998 | Teitel et al. | 356/141.4 |
| 5,846,134 A * | 12/1998 | Latypov | 463/46 |
| 5,905,525 A * | 5/1999 | Ishibashi et al. | 348/39 |
| 5,913,727 A * | 6/1999 | Ahdoot | 463/39 |
| 5,982,352 A * | 11/1999 | Pryor | 345/156 |
| 6,094,625 A * | 7/2000 | Ralston | 702/150 |
| 6,227,974 B1 * | 5/2001 | Eilat et al. | 463/40 |
| 6,457,024 B1 * | 9/2002 | Felsentein et al. | 707/206 |
| 6,549,641 B2 * | 4/2003 | Ishikawa et al. | 382/103 |
| 6,727,865 B1 * | 4/2004 | Yonezawa | 345/7 |
| 2001/0045978 A1 * | 11/2001 | McConnell et al. | 348/42 |
| 2002/0084974 A1 * | 7/2002 | Ohshima et al. | 345/156 |
| 2003/0032484 A1 * | 2/2003 | Ohshima et al. | 463/43 |

* cited by examiner

CONTROL APPARATUS AND METHOD FOR GAMES AND OTHERS

CROSS-REFERENCE TO RELATED APPLICATIONS

This application is a divisional of application Ser. No. 10/000,673, filed Nov. 15, 2001, now abandoned, the entire disclosure of which is hereby incorporated by reference.

BACKGROUND OF THE INVENTION

1. Field of the Invention

This invention relates to a control apparatus or an image processing apparatus and a control method which can be suitably applied to a system that executes games, various kinds of simulations, or the like.

2. Description of the Related Art

Conventionally, game systems or various kinds of simulation systems using computer graphics have been developed according to purposes.

For example, in a general game system controlling method, an operator in a game arcade or the like starts/terminates a game by referring to the conditions of game players, or game players show their intention to take part in a game by pressing a predetermined switch or the like so as to start/terminate the game.

In the case of a system that does not require game players to show their intention to take part in a game, the game is constantly progressing, and game players take part in the game during the progress of the game. Further, power sources of devices such as controllers used by game players are kept ON, or turned on/off by pressing a special switch or the like.

In the case of a system that changes the contents of a game according to the number of players taking part in the game at the same time, it is necessary to notify the system of the number of players taking part in the game by pressing a predetermined switch or the like.

However, if an operator starts/terminates a game according to the conditions of game players as in the above described example, it takes much cost to run a game arcade or the like in terms of personal expenses due to the need for such an operator.

In the case of the game system that requires no operator, if game players start a game by pressing a predetermined switch or the like to show their intention to take part in the game, the system is hard to operate since it is troublesome to operate the switch.

In the case of the system that does not require game players to show their intention to take part in a game, the game is constantly progressing. Therefore, for example, a plurality of game players cannot start/terminate the game at the same time.

Further, if power sources of devices used by game players are kept ON, the power is wasted, and if the power sources of the devices are turned on/off by operating a special switch or the like, the power cannot be saved efficiently since game players may forget turning off the power sources.

In the case of the system that changes the contents of a game according to the number of players taking part in the game at the same time, it is necessary to notify the system of the number of players taking part in the game by pressing a predetermined switch or the like. Thus, the system is hard to operate since it is troublesome to operate the switch.

SUMMARY OF THE INVENTION

It is therefore a first object of the present invention to provide a control apparatus or an image processing apparatus and a control method that are capable of automatically carrying out a game or simulation starting/terminating process according to operations performed necessarily in executing the game or simulation.

It is a second object of the present invention to provide a control apparatus and a control method that are capable of turning on/off power sources of devices for use in the game or simulation or changing the contents of the game (simulation) according to the actions of players.

To attain the first object, a first aspect of the present invention provides a control apparatus for a game or the like, comprising operating means mounted on or gripped by at least one player for operation, detecting means for detecting a positional relationship of the operating means with respect to a space for executing the game, and control means for carrying out a game starting/terminating process according to the positional relationship of the operating means detected by the detecting means.

Preferably, the control means comprises power source control means for turning on/off a power source of the operating means according to a position of the operating means.

In this case, it is preferable that the power source control means turns on the power source of the operating means if the detecting means detects that the operating means has entered a range of height wherein the apparatus is normally used, and turns off the power source of the operating means if the detecting means detects that the operating means has exited the range.

In a preferred embodiment, the apparatus is a game executing apparatus that executes a game by means of a plurality of the operating means, the control apparatus comprises a plurality of the detecting means provided separately for respective ones of the plurality of operating means to detect positions of the plurality of operating means, and the control means turns on a power source of at least one of the plurality of operating means if at least corresponding one of the detecting means detects that the at least one of the plurality of operating means has entered a range of height where the plurality of operating means are normally used, and turns off a power source of at least one of the plurality of operating means if at least corresponding one of the detecting means detects that the at least one of the plurality of operating means has exited the range of height.

Preferably, the detecting means detects a position of the operating means, and the control means carries out a game starting process if the operating means is detected as having entered a range of height where the operating means is normally used, and carries out a game terminating process if the operating means is detected as having exited the range of height.

In a preferred embodiment, the control apparatus is a game executing apparatus that executes a game by means of a plurality of the operating means, the detecting means, the control apparatus comprises a plurality of the detecting means provided separately for respective ones of the plurality of operating means to detect positions of the plurality of operating means, and the control means carries out a game starting process if the detecting means detect that all of the plurality of operating means have entered a range of height where the plurality of operating means are normally used, and carries out a game terminating process if the detecting means detect that at least one of the plurality of operating means has exited the range of height.

Preferably, the detecting means is a distance sensor that detects a distance from a floor.

Also preferably, the operating means is a controller that is gripped in use so as to progress the game.

In another preferred embodiment, the control means carries out a game starting process if the detecting means detects that the operating means has entered a predetermined area for executing the game, and carries out a game terminating process if the detecting means detects that the operating means has exited the predetermined area.

In a further preferred embodiment, the control means turns on a power source of the operating means if the detecting means detects that the operating means has entered a predetermined area for executing the game, and turns off the power source of the operating means if the detecting means detects that the operating means has exited the predetermined area.

In still another preferred embodiment, the control apparatus is a game machine that executes a game by means of a plurality of the operating means, the control apparatus comprises a plurality of the detecting means provided separately for respective ones of the plurality of operating means to detect positions of the plurality of operating means, and the control means carries out a game starting process if the detecting means detect that all of the plurality of operating means have entered a predetermined game area for executing the game, and carries out a game terminating process if the detecting means detect that at least one of the plurality of operating means has exited the predetermined game area.

In a still further preferred embodiment, the control apparatus is a game machine that executes a game by means of a plurality of the operating means, the control apparatus comprises a plurality of the detecting means provided separately for respective ones of the plurality of operating means, and the control means separately turns on a power source of at least one of the operating means if at least corresponding one of the detecting means detects that the at least one of the plurality of operating means has entered a predetermined game area for executing the game, and separately turns off a power source of at least one of the operating means if at least corresponding one of the detecting means detects that the at least one of the plurality of operating means has exited the predetermined game area.

In a further preferred embodiment, the control apparatus is a game machine that executes a game by means of a plurality of the operating means, the control apparatus comprises a plurality of the detecting means provided separately for respective ones of the plurality of the operating means, and the control means separately turns on a power source of at least one of the operating means if at least corresponding one of the detecting means detects that the at least one of the plurality of operating means has entered a predetermined storage area for storing the operating means, and separately turns off a power source of at least one of the operating means if at least corresponding one of the detecting means detects that the at least one of the plurality of operating means has the predetermined storage area.

Preferably, the detecting means comprises a magnetic sensor, and a magnetic field is formed in the predetermined game area or the predetermined storage area.

Also preferably, the operating means comprises a HMD (Head Mount Display) that is mounted on a head of a player to display contents of a game.

Further preferably, the operating means comprises a glove type controller that is mounted on a hand of a player to progress a game.

To attain the first object, a second aspect of the present invention provides a method of controlling a game or the like, comprising a recognizing step of recognizing a positional relationship of operating means mounted on or gripped by at least one player for operation with respect to a space for executing the game, and a game start/termination controlling step of starting/terminating the game according to the positional relationship of the operating means recognized in the recognizing step.

Preferably, the controlling step comprises a power source controlling step of turning on/off a power source of the operating means according to a position of the operating means.

In a preferred embodiment, the controlling step comprises a detecting step of detecting a position of the operating means, and the start/termination controlling step comprises carrying out a game starting process if the operating means is detected at the detecting step as having entered a range of height where the operating means is normally used, and carrying out a game terminating process if the operating means is detected as having exited the range of height in the detecting step.

To attain the first object, a third aspect of the present invention provides a computer-readable storage medium storing a processing program for executing a control method as defined above.

To attain the second object, a fourth aspect of the present invention provides a control apparatus for a game or the like, comprising operating means mounted on or gripped by at least one player for operation, and control means for changing contents of the game according to a number of the operating means used simultaneously in a space for executing the game.

In this case, it is preferable that the control apparatus is a game machine that executes a game by means of a plurality of the operating means, the control apparatus comprises a plurality of the detecting means provided separately for respective ones of the plurality of operating means, and the control means changes contents of the game according to a number of the operating means detected by the detecting means as having entered a range of height where the plurality of operating means are normally used.

In a preferred embodiment, the control apparatus is a game machine that executes a game by means of a plurality of the operating means, the control apparatus comprises according to the fourth aspect a plurality of the detecting means provided separately for respective ones of the plurality of operating means, and the control means comprises means for changing contents of the game according to a number of the operating means detected by the detecting means as having entered a predetermined game area.

The above and other objects, features and advantages of the invention will become more apparent from the following detailed description taken in conjunction with the accompanying drawings.

DESCRIPTION OF THE PREFERRED EMBODIMENTS

Preferred embodiments of the present invention will now be described with reference to the accompanying drawings.

First Embodiment

Figure 1:
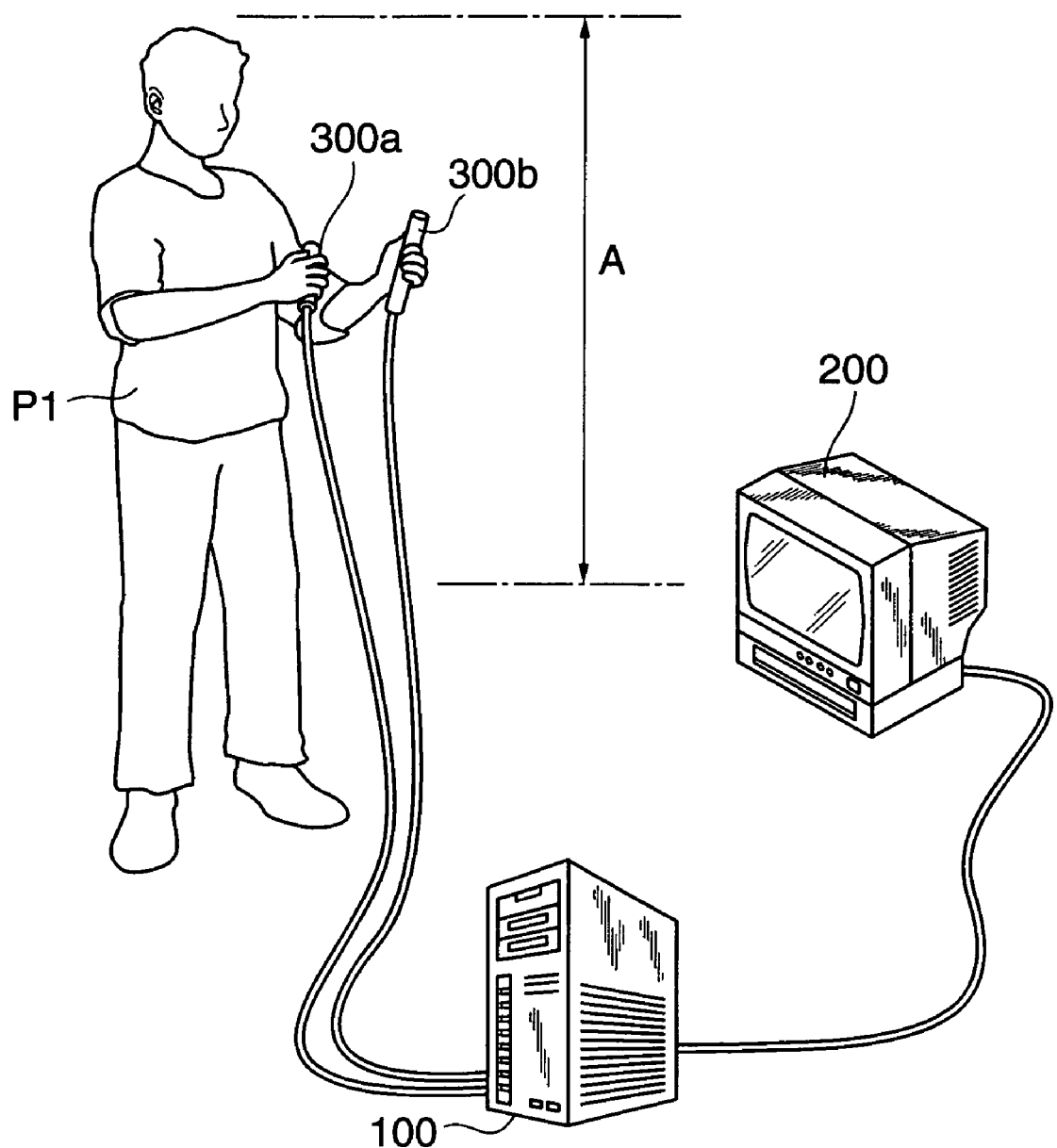
FIG. 1 is a view showing the arrangement of a game system as a control apparatus according to a first embodiment of the present invention.

FIG. 1 is a view showing the arrangement of a game system as a control apparatus according to a first embodiment of the present invention. A game machine body 100 is basically implemented by a computer, and is comprised of a CPU, internal storage devices such as a ROM and a RAM, and external storage devices such as a hard disk, and so forth, although illustration thereof is omitted. The external storage devices contain software for playing games, and software for executing a process shown in a flow chart of FIG. 2 (FIGS. 5 and 7 according to second and third embodiments). Such software may be acquired in arbitrary ways, e.g., by downloading from an apparatus on a network.

Rod type controllers 300*a*, 300*b* and a CRT display 200 are connected to the game machine body 100. The game machine body 100 progresses a game according to the operations, etc. of the rod type controllers 300*a*, 300*b* and displays a game screen and the like on the CRT display 200.

A game player P1 grip the two rod type controllers 300*a*, 300*b* to progress the game while watching the game screen displayed on the CRT display 200. Each of the rod type controllers 300*a*, 300*b* has a position sensor that transmits positional information to the game machine body 100.

The game machine body 100 starts or terminates the game according to the positions of the rod type controllers 300*a*, 300*b*, which are gripped by the hands of the player.

Specifically, the game machine body 100 provides control such that the game can be executed if the height of the rod type controllers 300*a*, 300*b* lies height of the rod type controllers 300*a*, 300*b* lies within a range A between the knee and head of the game player P1, i.e. a range A wherein the rod type controllers 300*a*, 300*b* are necessarily positioned when the rod type controllers 300*a*, 300*b* are operated to progress the game.

The game machine body 100 also progresses the game according to control signals transmitted from the rod type controllers 300*a*, 300*b*, and displays the game screen on the CRT display 200.

It should be noted that since the position sensors of the rod type controllers 300*a*, 300*b* according to the present embodiment have only to detect the positions within the range A between the knee and head of the game player P1, i.e. the height from a floor, distance sensors based on an ultrasonic wave reflection system, an optical reflection system, or the like may be used as the position sensors to roughly detect the distance (from the floor) according to the intensity, phase, etc. of ultrasonic wave or light reflected on the floor. Therefore, the position sensors of the rod type controllers 300*a*, 300*b* can easily be realized at low costs.

Incidentally, magnetic sensors or the like, which are capable of detecting the position and direction in a magnetic field formed in advance in a space where the game is played, may also be used as the position used for the game itself since they can detect the position and direction as well as the height from the floor to detect a gesture, etc. of the player. In this case, electric current must be carried through a block for use in detecting operation of the magnetic sensors, but a processing block concerned with the game may be turned off so that the same effects can be achieved by automation of the game turning on/off operation and the power saving while the apparatus is not used.

Figure 2:
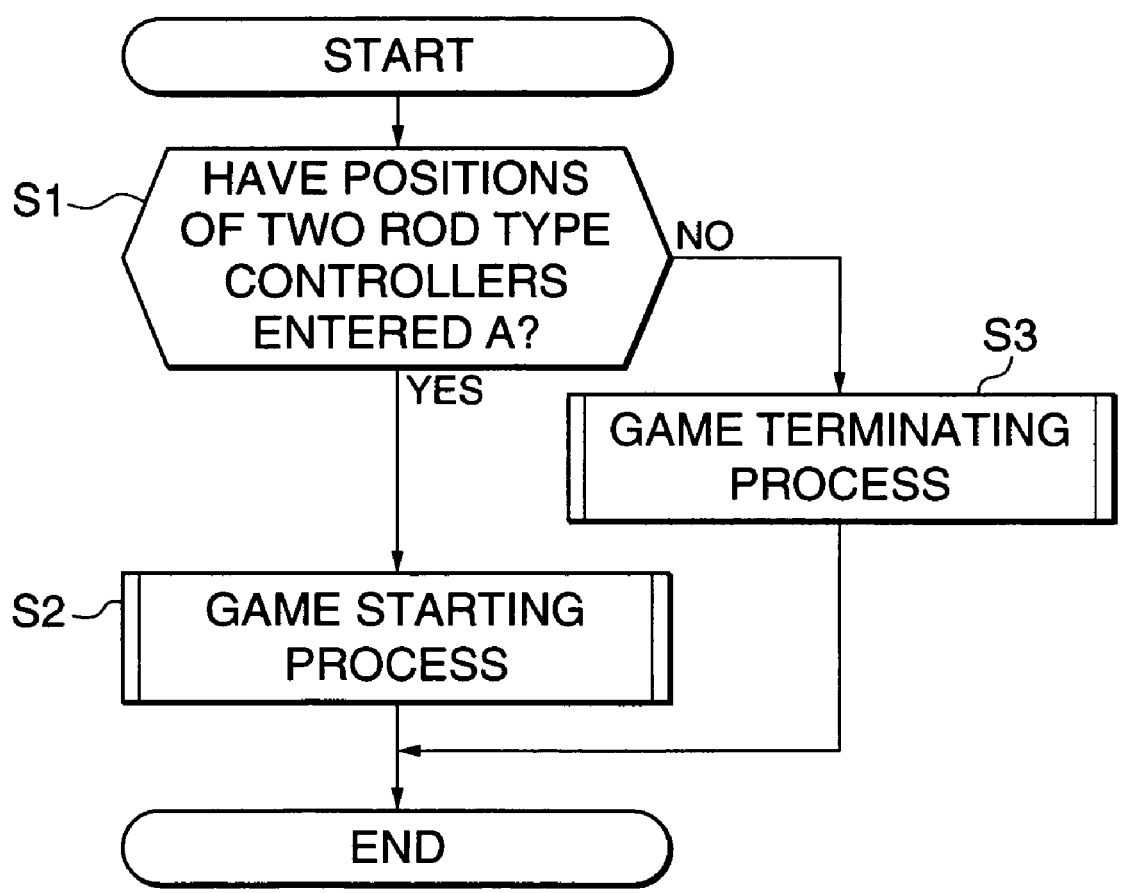
FIG. 2 is a flow chart showing a game starting/terminating process according to the first embodiment.

Referring next to a flow chart of FIG. 2, a description will be given of a game starting/terminating process according to the present embodiment.

The game machine body 100 determines whether both of the rod type controllers 300*a*, 300*b* have entered the range A or not according to signals transmitted from the position sensors of the rod type controllers 300*a*, 300*b* (step S1). If determining that both of the rod type controllers 300*a*, 300*b* have entered the range A, the game machine body 100 carries out a game starting process (step S2).

On the other hand, if determining that at least one of the rod type controllers 300*a*, 300*b* has exited the range A, the game machine body 100 carries out a game terminating process (step S3).

More specifically, the game is not started while the rod type controllers 300*a*, 300*b* lie on the floor. If the game player P1 picks up the rod type controllers 300*a*, 300*b* from the floor, the positions thereof enter the range A. Upon detection of the position sensors to that effect, the game machine body 100 starts the game.

To terminate the game, the game player P1 places the rod type controllers 300*a*, 300*b*, which are gripped by his or her hands, on the floor. This causes the positions of the rod type controllers 300*a*, 300*b* to exit the range A. Upon detection of the position sensors to that effect, the game machine body 100 terminates the game.

The above described processes enable the game player P1 to automatically start/terminate the game by performing only a normal operation required for the start/termination of the game without consciously performing a special operation for starting/terminating the game.

It should be noted that it is possible to separately turn on power sources of the rod type controllers 300*a*, 300*b* (strictly speaking, power sources of devices other than the position sensors) if the positions of the type controllers 300*a*, 300*b* enter the range A, and it is possible to separately turn off the power sources for the rod type controllers 300*a*, 300*b* if the positions of the type controllers 300*a*, 300*b* exit the range A.

Second Embodiment

Second Embodiment

Figure 3:
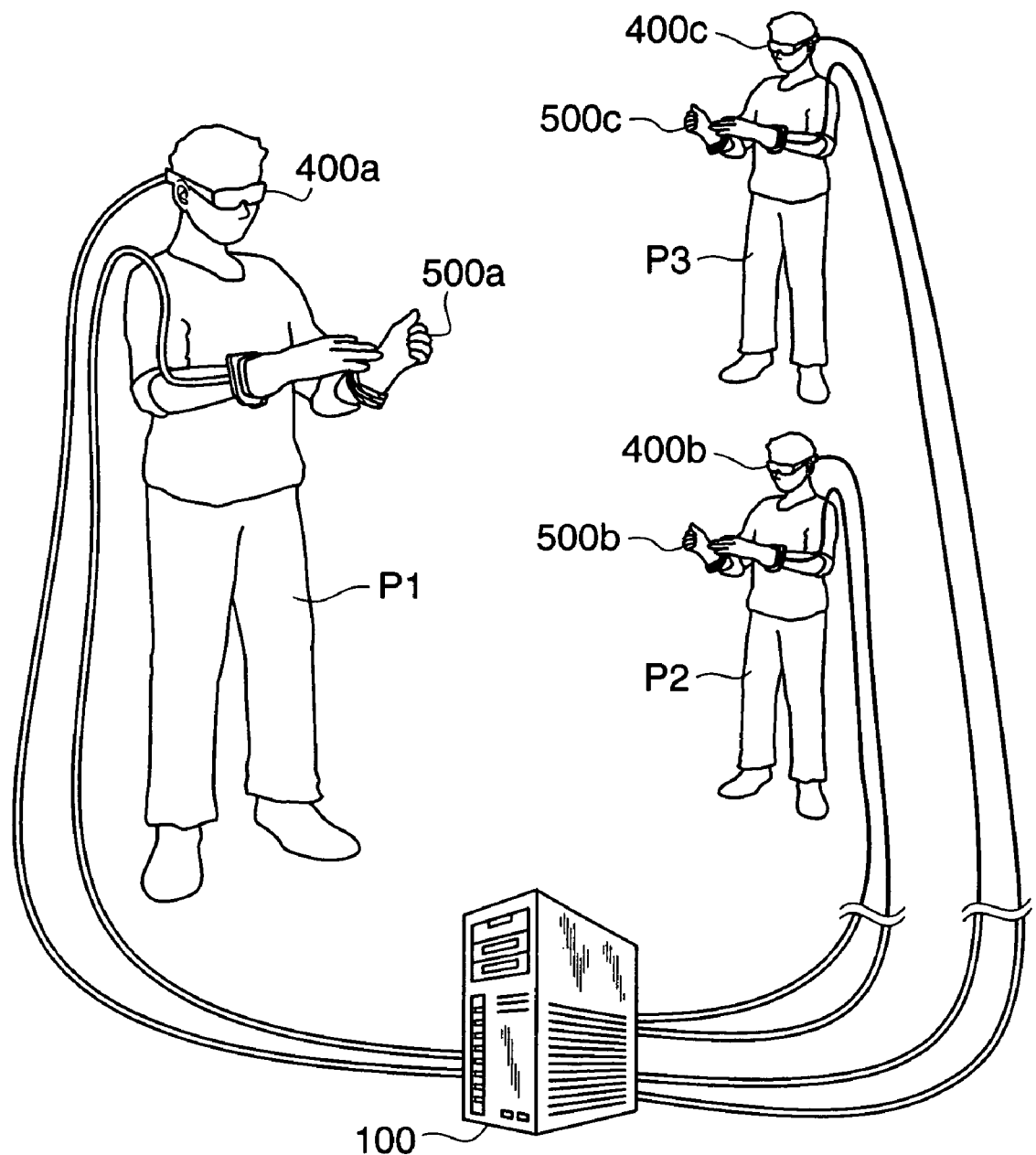
FIG. 3 is a view showing an example of the arrangement of a game system as a control apparatus according to a second embodiment.

FIG. 3 is a view showing the arrangement of a game system as a control apparatus according to a second embodiment of the present invention.

Game players P1, P2, P3 mount thereon HMDs (Head Mount Displays) 400*a*, 400*b*, 400*c*, respectively, and operating gloves 500*a*, 500*b*, 500*c*, respectively. Each of the HMDs 400a, 400b, 400c and the operating gloves 500a, 500b, 500c is provided with a position sensor that transmits positional information to the game machine body 100. The operating gloves 500a, 500b, 500c serve as game controllers capable of transmitting a variety of instructions according to the positions and gestures of the players.

A plurality of game players takes part in a game that is progressed by the game system according to the present embodiment, and the game progresses in a virtual space shared by all the game players. The game machine body 100 progresses the game according to control signals transmitted from the HMDs 400a, 400b, 400c and the operating gloves 500a, 500b, 500c, and displays scenes in a virtual space, seen from the viewpoints of the respective game players, on the HMDs 400a, 400b, 400c.

The game system according to the present embodiment starts the game when all the game players get ready, and this requires a means that notifies the system that all the game players get ready. Although an operator conventionally starts or terminates the game according to the conditions of game players, the arrangement shown in FIG. 4 eliminates the need for such an operator.

Figure 4:
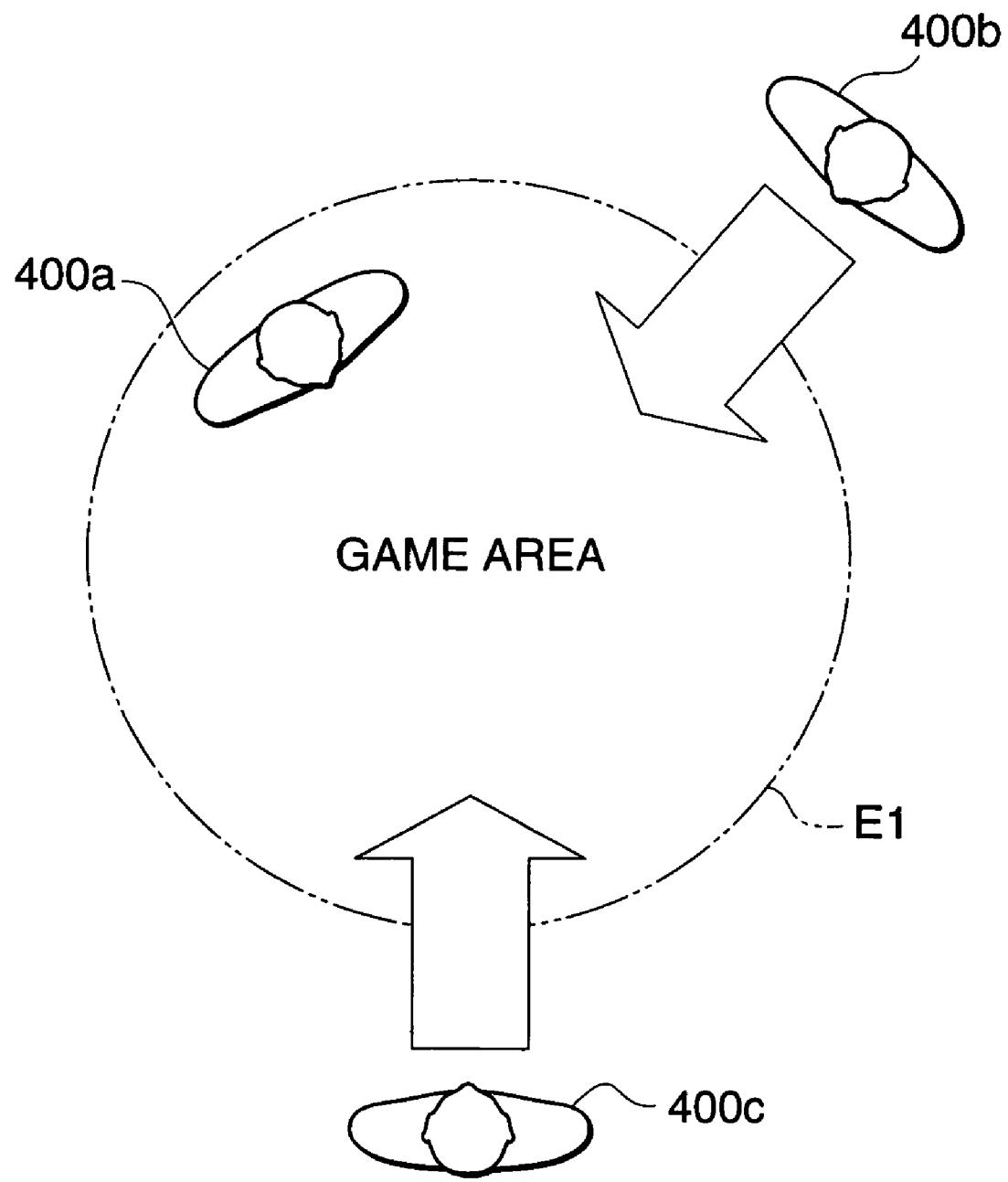
FIG. 4 is a view showing a game area according to the second embodiment.

FIG. 4 illustrates the conditions of the game players, etc. viewed from directly above. A range called a game area E1 is set, and a game starting process is carried out when all the game players enter the game area E1. A game terminating process is carried out when the game is ended dependently on a game scenario, or when at least one of the game players exits the game area E1.

Figure 5:
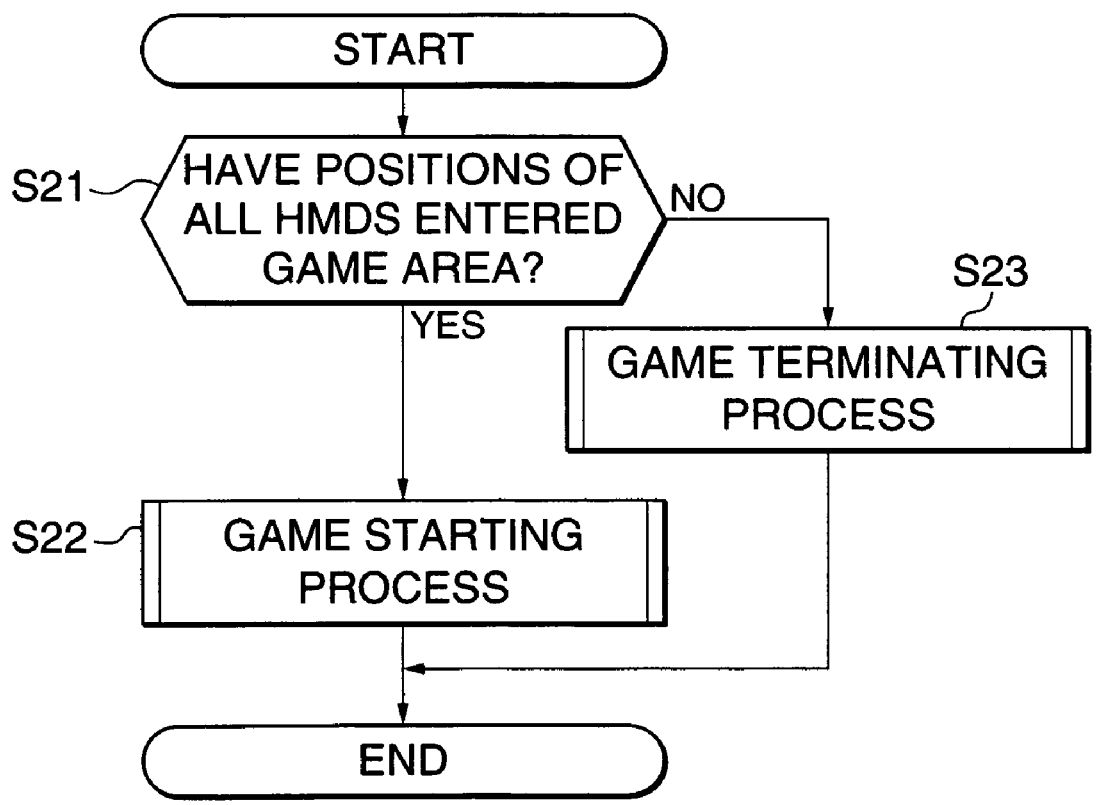
FIG. 5 is a flow chart showing a game starting/terminating process according to the second embodiment.

It should be noted that the game area E1 is used for playing the game, and, for example, a magnetic field whose magnetic line of force is gradually changed in intensity (this also applies to an equipment storage area E2 according to a third embodiment described later) is formed in the game area E1. The position sensor provided in each of the HMDs 400a, 400b, 400c and the operating gloves 500a, 500b, 500c is comprised of, for example, a magnetic reluctance element, and is capable of detecting the position according to changes in electric current flowing through the magnetic reluctance element due to the intensity of the magnetic force line, the angle at which the electric current intersects the magnetic force lines (this also applies FIG. 5 is a flow chart showing a game starting/terminating process according to the second embodiment. This flow chart shows the case where the positions of the HMDs 400a, 400b, 400c are regarded as the positions of the game players, but the same process can be carried out if the positions of the control gloves 500a, 500b, 500c are regarded as the positions of the game players.

The game machine body 100 determines whether all the HMDs 400a, 400b, 400c have entered the game area E1 or not according to signals transmitted from the position sensors of the HMDs 400a, 400b, 400c (step S21). If it is determined that that all the HMDs 400a, 400b, 400c have entered the game area E1, the game starting process is carried out (step S22).

On the other hand, if determining that at least one of the HMDs 400a, 400b, 400c has exited the game area E1, the game machine body 100 carries out the game terminating process (step S23).

The above described processes enable the game players P1 to P3 to automatically start/terminate the game only by performing a normal operation required for the start/termination of the game without consciously performing a special operation for starting/terminating the game.

It should be noted that it is possible to separately turn on power sources of the HMDs 400a, 400b, 400c or the operating gloves 500a, 500b, 500c if the HMDs 400a, 400b, 400c or the operating gloves 500a, 500b, 500c have entered the game area E1, and it is possible to separately turn off the power sources of the HMDs 400a, 400b, 400c or the operating gloves 500a, 500b, 500c if the HMDs 400a, 400b, 400c or the operating gloves 500a, 500b, 500c have exited the game area E1.

Further, as the HMDs 400a, 400b, 400c, it is possible to use see-through type HMDs capable of displaying not only the contents of a game but also the conditions of the outside, or non see-through type HMDs capable of displaying only the contents of a game. If the see-through type HMDs are used, a player mounts thereon the HMDs at a position outside the game area E1 and then enters the game area E1 to start a game.

If the non see-through type HMDs are used, a player enters the game area E1 while holding the HMDs by hands to start a game and then mounts thereon the HMDs.

Third Embodiment

Figure 6:
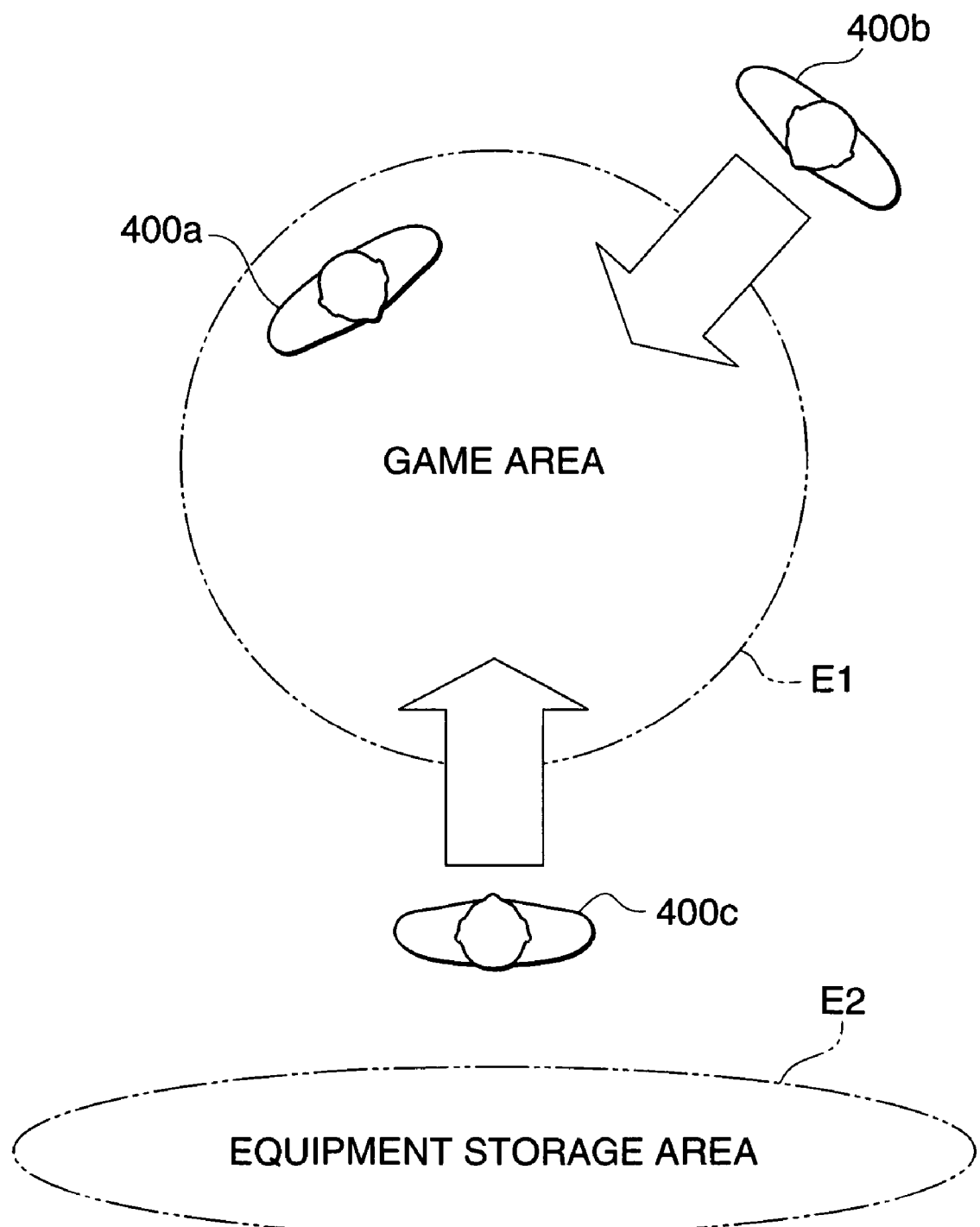
FIG. 6 is a view showing a game area and a storage area according to a third embodiment of the present invention.

FIG. 6 is a view useful in explaining a game system as a control apparatus according to a third embodiment of the present invention.

The third embodiment is identical with the second embodiment in the game starting/terminating process, but is different from the second embodiment in that an but is different from the second embodiment in that an equipment storage area E2 is added.

If the HMDs 400a, 400b, 400c are present in the equipment storage area E2, the devices other than the position sensors of the HMDs 400a, 400b, 400c are off. If the game players take out the HMDs 400a, 400b, 400c from the equipment storage area to take part in a game, the HMDs 400a, 400b, 400c exit the equipment storage area E2 to cause the power sources of the HMDs 400a, 400b, 400c to be turned on. If the game players place the HMDs 400a, 400b, 400c in the equipment storage area E2, the power sources of the HMDs 400a, 400b, 400c are automatically turned off.

Figure 7:
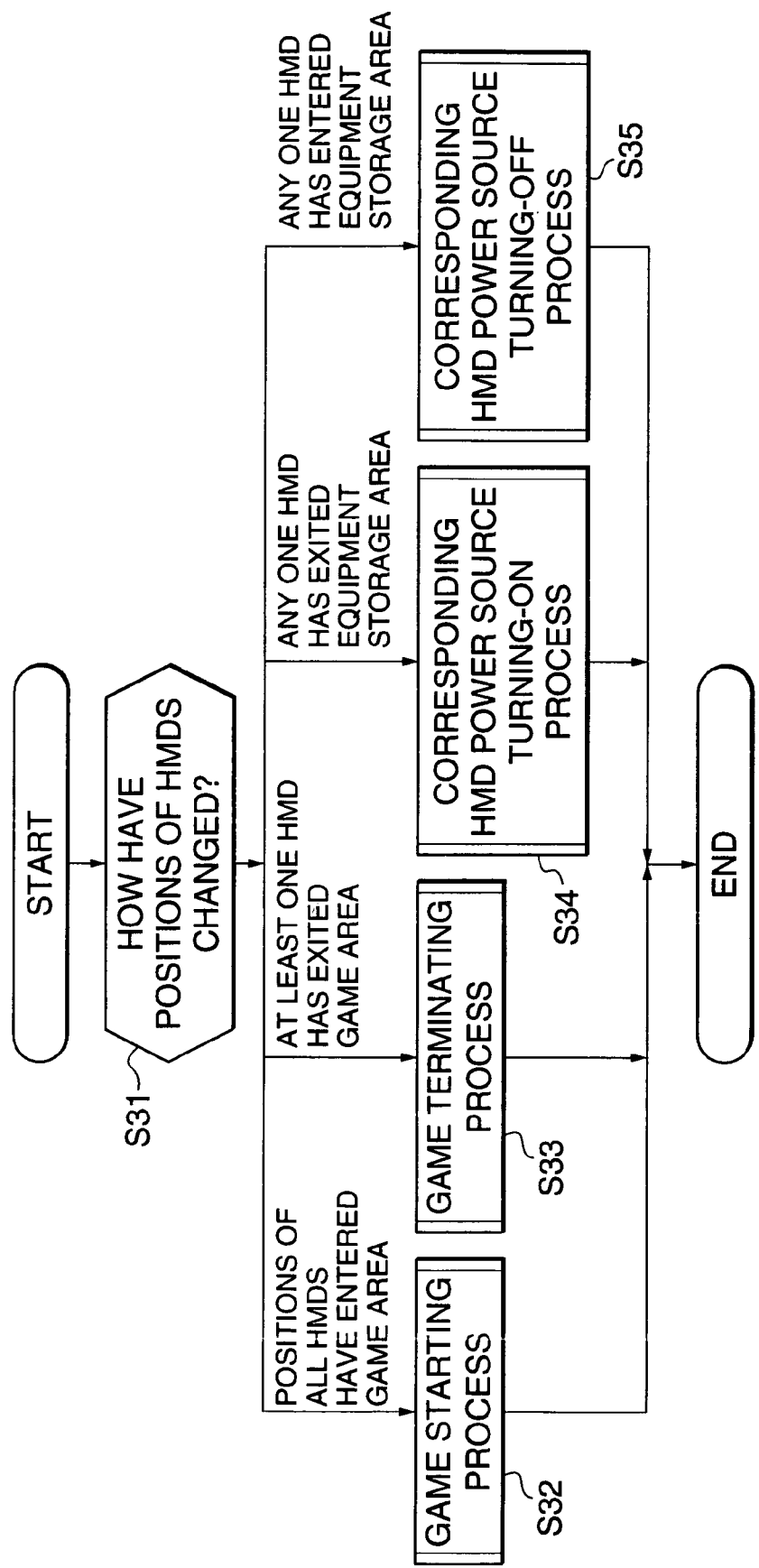
FIG. 7 is flow chart showing a process characteristic of the third embodiment.

FIG. 7 is a flow chart showing a process characteristic of the present embodiment. This flow chart shows the case where the HMDs 400a, 400b, 400c are used, but the same process may be carried out in the case where the operating gloves 500a, 500b, 500c are used.

According to signals from the position sensors of the HMDs 400a, 400b, 400c, the game machine body 100 recognizes the positions of the HMDs 400a, 400b, 400c (step S31).

If the game machine body 100 determines that all the HMDs 400a, 400b, 400c have entered the game area E1, a game starting process is carried out (step S32). If the game machine body 100 determines that at least one of the HMDs 400a, 400b, 400c has exited the game area E1, a game terminating process is carried out (step S33).

Further, if any one of HMDs 400a, 400b, 400c has exited the equipment storage area E2, the power source of the corresponding one of the HMDs 400a, 400b, 400c is turned on (step S34). If any one of the HMDs 400a, 400b, 400c has entered the equipment storage area E2, the power source of the corresponding one of the HMDs 400a, 400b, 400c is turned off (step S35).

The above described processes enable the game players P1 to P3 to automatically start/terminate the game only by performing a normal operation required for the start/termination of the game and properly turn on/off the power sources of the HMDs 400a, 400b, 400c and the operating gloves 500a, 500b, 500c without consciously performing a special operation for starting/terminating the game.

Fourth Embodiment

Referring again to FIGS. 3 and 4, a description will now be given of a game system as a control apparatus according to a fourth embodiment of the present invention.

If only one game player P1 takes part in a game that is supposed to be progressed by three players, the game machine body 100 generates CG characters therein who play the roles of the other two players.

The generated CG characters are projected on the HMD 400a mounted on the game player P1. If the second game player P2 then takes part in the game, the game machine body 100 generates only one CG character.

The generated CG character is projected on the HMD 400a and 400b mounted on the game players P1 and P2.

If the third game player P3 takes part in the game, the game machine body 100 does not generate any CG character.

By the above described process, the respective game players feel as if three players were constantly taking part in the game.

Figure 8:
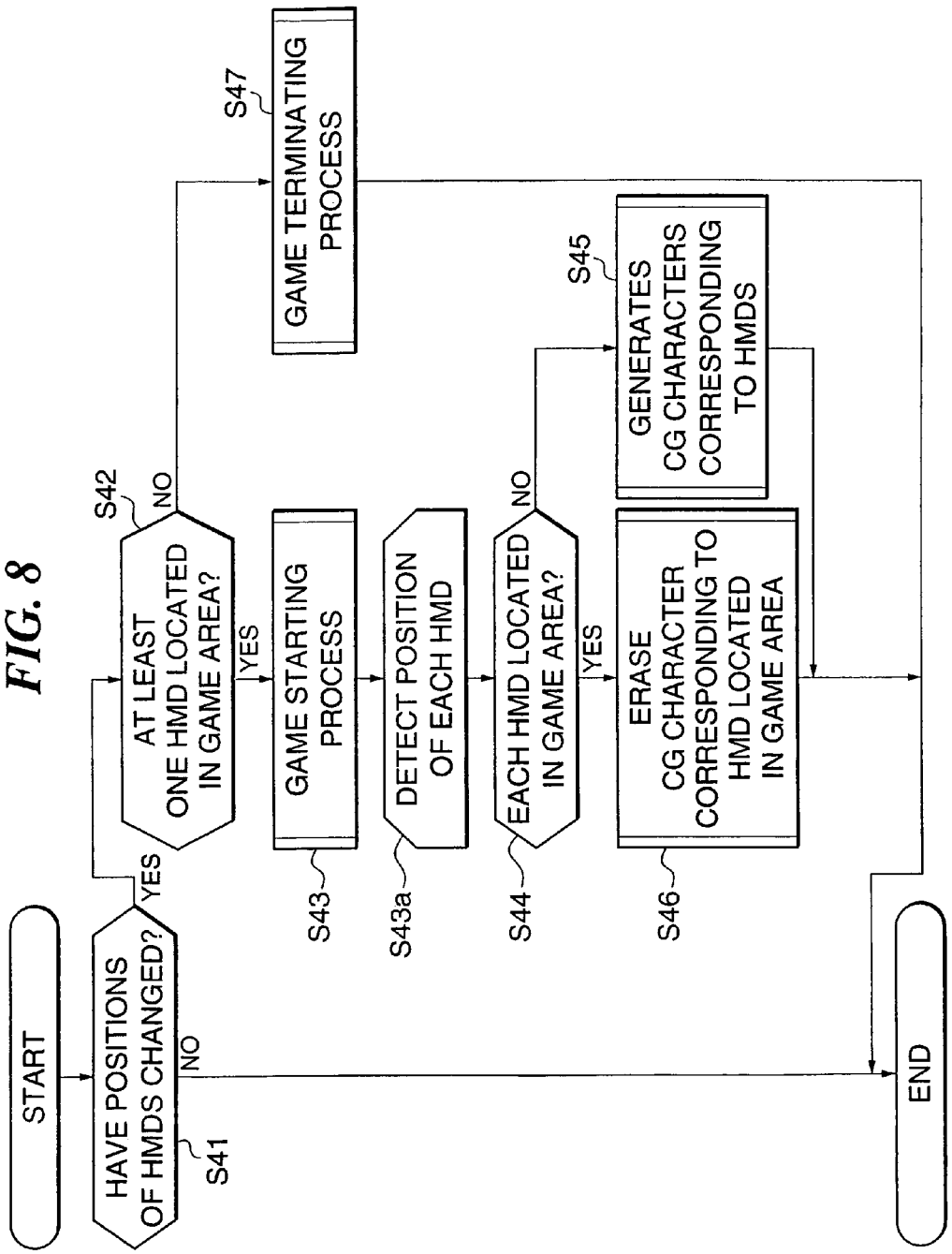
FIG. 8 is a flow chart showing a process characteristic of a fourth embodiment of the present invention.

FIG. 8 is a flow chart showing a process characteristic of the present embodiment. This flow chart also shows the case where the HMDs 400a, 400b, 400c are used, but the same process may be carried out in the case where the operating gloves 500a, 500b, 500c are used.

According to signals from the position sensors of the HMDs 400a, 400b, 400c, the game machine body 100 recognizes the positions of the HMDs 400a, 400b, 400c (step S41).

If the game machine body 100 determines that at least one of the HMDs 400a, 400b, 400c is present in the game area E1 (step S42), a game starting process is carried out (step S43).

After the start of the game, the position of each determined whether each of the HMDs is located in the game area E1 or not (step S44).

If the game machine body 100 determines that the HMD is located in the game area E1, the game machine body 100 generates CG characters corresponding to the HMDs so that three players can progress the game.

Therefore, a process for generating CG characters corresponding to the HMDs is carried out (step S45).

If it is determined that any HMD is located in the game area E1, a real human being plays a character corresponding to the HMD, and a part or all of the human being should be directly displayed as a character. Thus, the game machine body 100 does not have to generate the corresponding CG character.

Therefore, a process for erasing the CG character corresponding to the HMD is carried out (step S46).

If all the HMDs are located outside the game area E1 (step S42), a game terminating process is carried out because no game player is taking part in the game (step S47).

Figure 9:
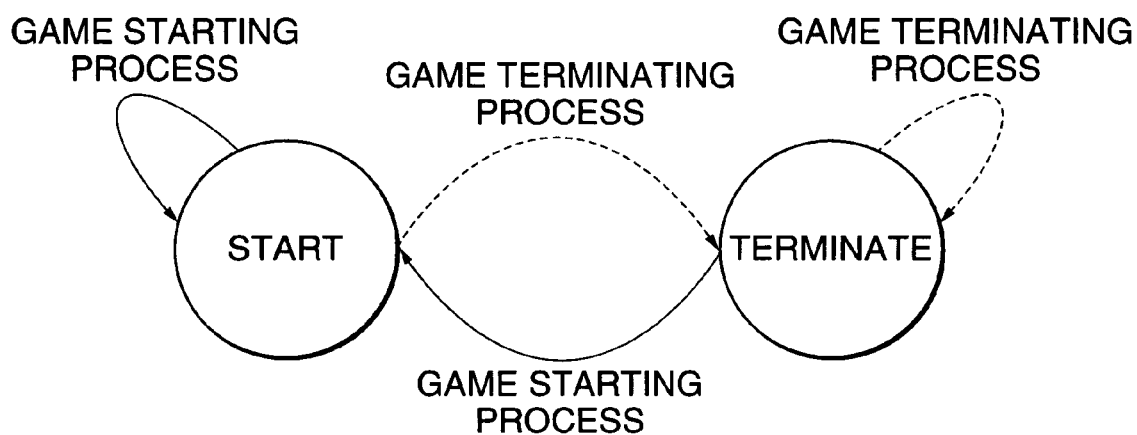
FIG. 9 is a state transitional diagram related to the start of a game, that supplements the process characteristic of the fourth embodiment.
Figure 10:
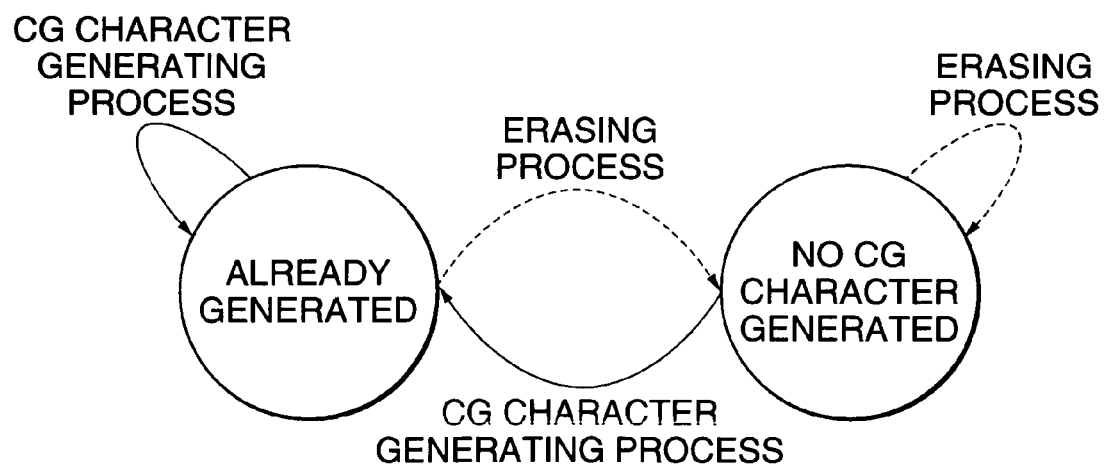
FIG. 10 is a state transitional diagram related to the generation of a CG character, that supplements the process characteristic of the fourth embodiment.

FIGS. 9 and 10 are state transitional diagrams supplementing the flow chart of FIG. 8.

If the game terminating process is carried out in a game starting state, the game shifts to a terminating state.

However, even if the game starting process is carried out in the starting state, the game remains carried out in the starting state, the game remains unchanged in the starting state.

On the contrary, if the game starting process is carried out in the terminating state, the game shifts to the terminating state, but even if the game starting process is carried out in the game terminating state, the game remains unchanged in the terminating state.

This also applies to a CG character generating state.

If a CG character erasing process is carried out if a CG character has already been generated, the CG character is erased so that the game can shift to a state in which the CG character has not yet been generated, but even if a CG character generating process is carried out, the game remains in a state in which the CG character has already been generated.

On the contrary, if a CG character generating process is carried out in a state in which a CG character has not yet been generated, the CG character is newly generated so that the game can shift to a state in which the CG character has already been generated, but even if a CG character erasing process is carried out, the game remains in a state in which the CG character has not yet been generated.

Although in the above described embodiments, three players progress the game, the number of players should taking part in the game depends on the contents of a game such as a match game (two players) or a mahjong game (four players).

Further, the present invention may be applied to a game that is progressed by at least three players, and if three or more players take part in the game, no CG character is generated.

Further, the number of CG characters should not necessarily be controlled according to the number of players taking part in a game, but it is possible to change the contents of the game.

For example, in the case of a racing game or the like, if only one player is taking part in the game, the game is progressed in a practice mode, and if two or more players are taking part in the game, the game is progressed in a match mode.

It should be understood, however, that there is no intention to limit the present invention to the embodiments disclosed. For example, in the first embodiment, the range for use in determining whether the game starting/terminating process is to be carried out or not may be set as a predetermined range at the front of the screen of the CRT display. Moreover, the present invention may be applied to a game machine that is used in combination with one rod type controller, HMD, operating glove, or the like.

Further, if a game can be executed by using at

Further, if a game can be executed by using at least two rod type controllers, HMDs, operating gloves, or the like in a game machine to which three or more rod type controllers, HMDs, operating gloves, or the like are connected, the game may be started if at least two rod type controllers, HMDs, operating gloves, or the like have entered a predetermined area.

Although the above description is based on a case where the present invention is applied to a game machine, the present invention may be applied to any kinds of apparatuses having controllers mounted on a player in a wide range of applications such as various kinds of simulations, and image processing operations using virtual realities.

Further, although the term "game" is used in some of the appended claims, the present invention should not be necessarily limited to this, but the present invention may also be applied to simulations, virtual realities, and the like without deviating from the spirit and scope of the invention.

As described hereinabove, the present invention makes it possible to automatically carry out a game starting/terminating process based upon operations necessarily performed in playing a game, turn on/off the power sources of the devices used by game players, or change the contents of the game.

What is claimed is:

1. An information processing apparatus for displaying scene in a virtual space according to a position of each of a plurality of head mount displays (HMDs), each head mount display having a sensor for use in detecting the position of the head mount display, comprising:

an acquiring unit configured to acquire the positions of the plurality of head mount displays in order to determine the presence or absence of the plurality of head mount displays from the positions detected and transmitted to the acquiring unit by the sensors, each of the head mount displays is mounted on each of plural players, the players sharing the virtual space;

a determining unit configured to determine from the presence or absence whether all the plurality of head mount displays are present within a predetermined area in a real space;

a control unit configured to start displaying scenes in the virtual space on the plurality of the head mount displays, when it is determined by the determining unit that all the plurality of head mount displays are present within the predetermined area in the real space; and a HMD power source controller for controlling turning on and off a power source of each said head mount display, wherein when each said head mount display has entered an equipment storage area, said HMD power source controller turns off the power source of that head mount display, and wherein when each said head mount display has exited from the equipment storage area, said HMD power source controller turns on the power source of that head mount display that has exited from the equipment storage area.

2. An information processing apparatus according to claim 1, wherein said head mount displays are see-through type head mount displays.

3. An information processing apparatus according to claim 1, wherein said control unit terminates displaying the scenes in the virtual space on the plurality of the head mount displays, when any one of the plurality of head mount displays is absent from the predetermined area in the real space.

4. An information processing method for displaying scene in a virtual space according to a position of each of a plurality of head mount displays, each head mount display having a sensor for use in detecting the position of the head mount display, comprising the steps of:

acquiring the positions of a the plurality of head mount displays in order to determine the presence or absence of the plurality of head mount displays from the positions detected and transmitted to the acquiring unit performing the acquiring by the sensors, each of the head mount displays is mounted on each of plurality of players, the players sharing the virtual space;

determining from the presence or absence whether all the plurality of head mount displays are present within a predetermined area in a real space;

starting displaying scenes in the virtual space on the plurality of the head mount displays, when it is determined that all the plurality of head mount displays are present within the predetermined area in the real space, and controlling turning on and off a power source of each said head mount display, wherein when each said head mount display has entered an equipment storage area, the power source of that head mount display is turned off, wherein when each said head mount display has exited from the equipment storage area, the power source of that head mount display that has exited from the equipment storage area is turned on.

* * * * *